(12) United States Patent
Ring et al.

(10) Patent No.: US 6,394,559 B1
(45) Date of Patent: May 28, 2002

(54) CONTROL APPARATUS FOR THE APPLICATION AND RELEASE OF A HAND BRAKE

(75) Inventors: Michael E. Ring, Crown Point, IN (US); Ronald Henry, Salem, VA (US); James E. Hart, Trafford, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/664,211

(22) Filed: Sep. 15, 2000

(51) Int. Cl.[7] .............................................. B60T 17/02
(52) U.S. Cl. ........................... 303/13; 303/8; 303/128; 188/33; 188/107
(58) Field of Search ..................... 188/33, 107, 153 R, 188/49–55, 106 R, 106 P; 303/18, 9.61, 2, 3, 50–51, 71, 128, 13–17, 85, 86, 33, 36, 7, 8

(56) References Cited

U.S. PATENT DOCUMENTS

| | | | | |
|---|---|---|---|---|
| 2,511,336 A | * | 6/1950 | Hudson ................... | 188/153 R |
| 4,175,793 A | * | 11/1979 | Clemmons ................... | 303/89 |
| 5,549,363 A | * | 8/1996 | Kanjo et al. ................... | 303/7 |
| 5,794,739 A | * | 8/1998 | Ring et al. ............... | 188/153 R |

* cited by examiner

*Primary Examiner*—Pam Rodriguez
(74) *Attorney, Agent, or Firm*—James Ray & Associates

(57) ABSTRACT

A control apparatus is provided which is engageable with a hand brake assembly on a railway vehicle for operation of an application cylinder for applying the hand brake assembly. This apparatus includes a source of fluid pressure which is engageable with the railway vehicle. A pneumatic actuation valve which is connected to the source of fluid pressure for initiating communication of fluid pressure from the source of fluid pressure. A force regulating valve which is connected to the pneumatic actuation valve for receiving the fluid pressure from the actuation valve and a mechanically driven valve is connected to the force regulating valve for receiving the fluid pressure from the force regulating valve and for communicating the fluid pressure to the application cylinder to apply the hand brake assembly. An electrically controlled valve may be positioned intermediate the source of fluid pressure and the force regulating valve to enable electrical actuation of fluid communication from the source of fluid pressure to the force regulating valve. Additionally, a pneumatic actuation valve and/or an electrically controlled actuation valve may be provided to communicate fluid pressure from a source of fluid pressure to a release cylinder in order to release the brakes of the hand brake assembly.

27 Claims, 4 Drawing Sheets

CONTROL APPARATUS FOR THE APPLICATION AND RELEASE OF A HAND BRAKE

FIELD OF THE INVENTION

The present invention relates, in general to hand brake assemblies for use on railway type vehicles and, more particularly to a pneumatically and/or electrically activated control apparatus for activating a hand brake assembly on a railway vehicle. The apparatus of the present invention is also capable of pneumatically or electrically releasing the hand brake assembly on the railway vehicle.

BACKGROUND OF THE INVENTION

Prior to the conception and development of the present invention, railway car hand brake mechanisms were well known in the art. They usually include a large, rotatable hand wheel disposed in a vertical plane and mounted on a shaft which, through a gear train, can rotate a chain drum to wind up a chain that is secured at its end remote from the chain drum to the brake rigging of the railway car. As the hand wheel is rotated in one direction, the brakes are applied and rotation of the hand wheel shaft in the opposite direction is prevented by a pawl which engages a detent wheel on the hand wheel shaft. The hand wheel is rotated manually and requires an operator to apply a sufficient amount of force thereto.

The brakes may be released by disengaging the pawl from the detent wheel by manually turning the hand wheel in an opposite direction, however this may cause rapid rotation of the hand wheel which may cause a hazardous condition. To avoid rapid rotation of the hand wheel, hand brake mechanisms have been devised which are known as "quick release" mechanisms. Generally these quick release mechanisms include a releasable connecting means between the hand wheel shaft and the gear train. When the connecting means is released, the gears of the gear train rotate rapidly, without constraint by the pawl and detent wheel, but the hand wheel remains stationary.

As can be seen from the above-discussion, it would be advantageous to have an automatic application apparatus controlled by a pneumatic or electronic system for applying the hand brake and releasing the hand brake. Such a system would thereby reduce the force required to apply the brakes and avoid a hazardous condition upon the release of the brakes. Such automatic application apparatus is the subject of a co-pending application Ser. No. 09/507,227, filed Feb. 18, 2000 entitled Automatic Application Hand Brake. This co-pending application is owned by the assignee of the present invention and is incorporated into the present application by reference thereto.

SUMMARY OF THE INVENTION

According to a first aspect, the present invention is directed to an apparatus engageable with a hand brake assembly on a railway vehicle for operation of an application cylinder for applying the hand brake assembly. This apparatus comprises a source of fluid pressure which is engageable with the railway vehicle. A pneumatic actuation valve is connected to this source of fluid pressure for initiating communication of fluid pressure from the source of fluid pressure. A force regulating valve is connected to the pneumatic actuation valve for receiving the fluid pressure from the actuation valve and a mechanically driven valve is connected to the force regulating valve for receiving the fluid pressure from the force regulating valve and for communicating the fluid pressure to the application cylinder to apply the hand brake assembly.

In a second aspect of the invention, an electrically controlled valve may be positioned intermediate the source of fluid pressure and the force regulating valve to enable electronic actuation of fluid communication from the source of fluid pressure to the force regulating valve.

Additionally, a pneumatic actuation valve and/or an electrically controlled actuation valve may be provided to communicate fluid pressure from a source of fluid pressure to a release cylinder in order to release the brakes of the hand brake assembly.

OBJECTS OF THE INVENTION

It is, therefore, a primary object of the invention to provide a control apparatus for applying the hand brake assembly on a railway vehicle.

Another object is to provide a control apparatus which is capable of releasing the hand brake assembly of the railway vehicle.

Yet another object is to provide a control apparatus which is capable of applying and/or releasing the hand brake assembly of the railway vehicle through the use of a pneumatic actuation valve.

Still yet another object is to provide a control apparatus which is capable of applying and/or releasing the hand brake assembly of the railway vehicle through the use of an electrically controlled actuation valve.

Another object is to provide a control apparatus engageable with a hand brake assembly which applies and/or releases the hand brake assembly on a railway vehicle without requiring an operator to manually wind and/or unwind the chain on the hand brake.

Yet another object is to provide a control apparatus which releases hand brake assembly on a railway vehicle without requiring an operator to manually release the quick release handle.

Still another object is to provide a control apparatus engageable with a hand brake assembly which may be used by an operator of basically any physical size or stature.

An even further object is to provide a control apparatus engageable with a hand brake assembly which will provide the necessary torque to set such hand brake properly and will substantially minimize the possibility of an operator improperly setting the hand brake by not applying enough torque or conversely by applying too much torque which could damage the brake rigging.

In addition to the several objects and advantages of the present invention generally described above, various other objects and advantages of the invention will become much more readily apparent to those persons who are skilled in the relevant art from the following more detailed description, particularly, when such detailed description is taken in conjunction with the attached drawing figures and the claims appended hereto.

DETAILED DESCRIPTION OF THE INVENTION

Figure 1:
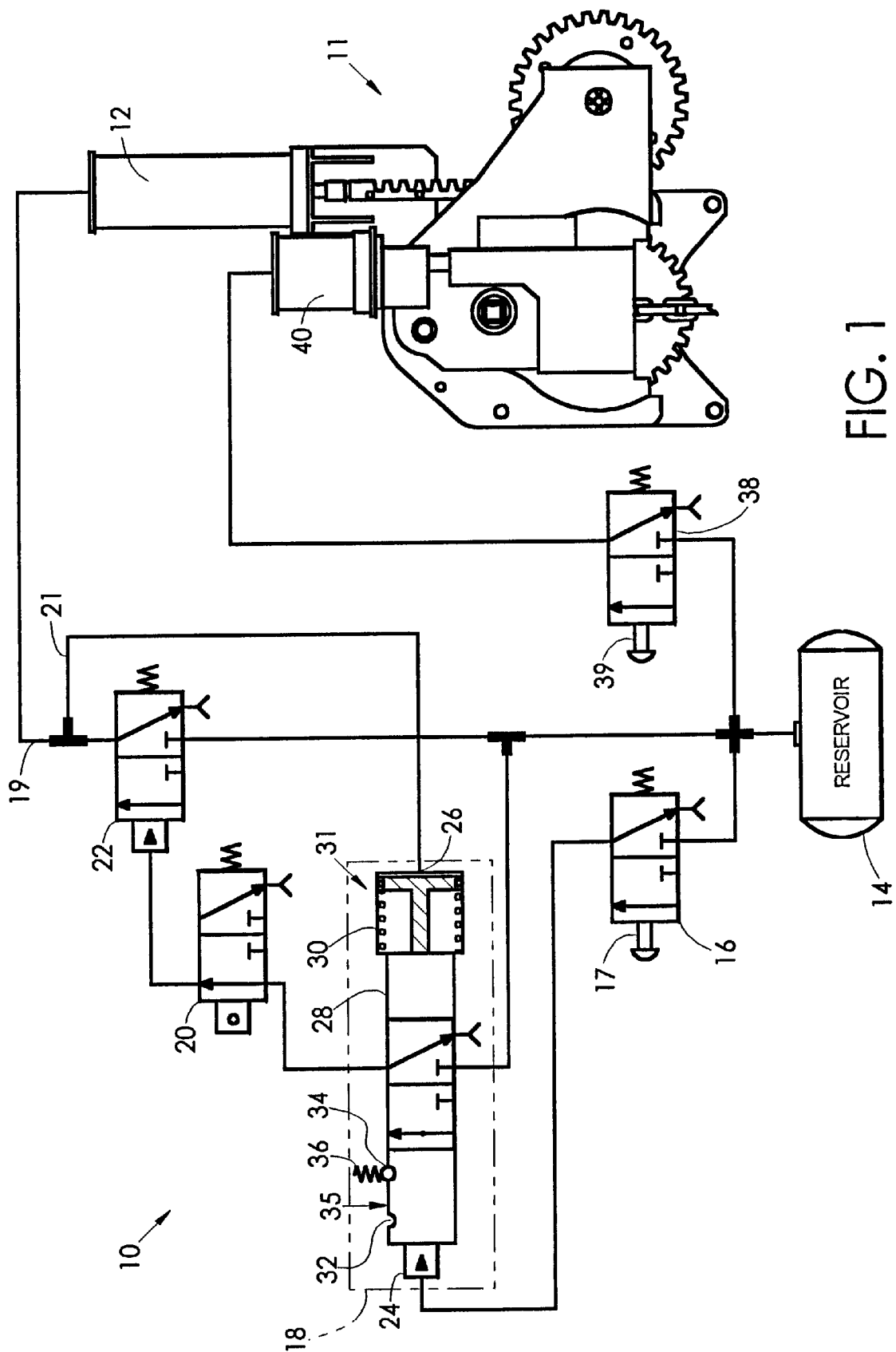
FIG. 1 is a schematic representation of the control apparatus of the invention connected to a hand brake for pneumatically controlling the application and release of the hand brake.

Before describing the invention in detail, the reader is advised that, for the sake of clarity and understanding, identical components having identical functions have been marked where possible with the same reference numerals in each of the Figures provided in this document.

Figure 3:
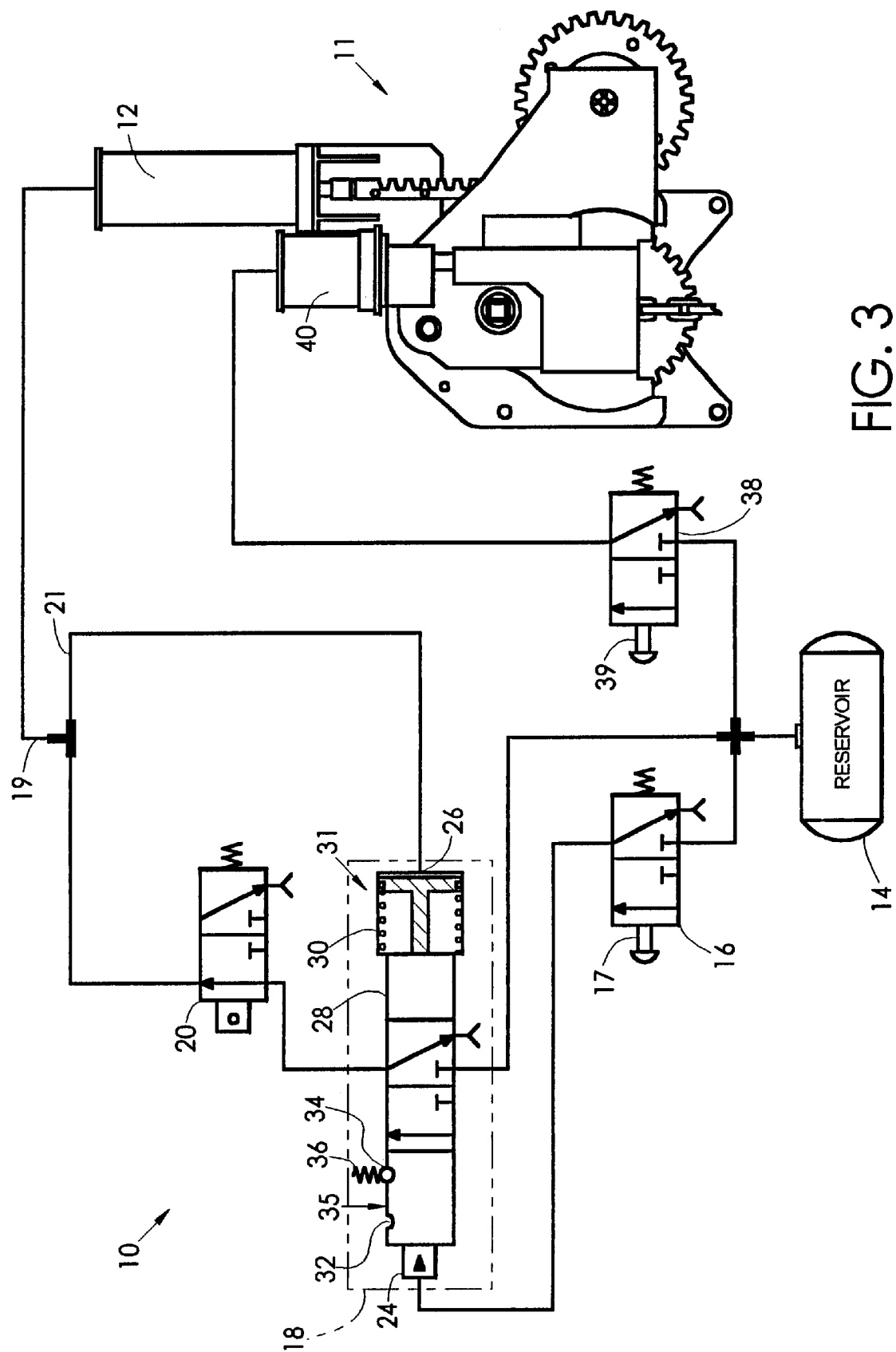
FIG. 3 is a schematic representation of a modified control apparatus connected to a hand brake for pneumatically controlling the application and release of the hand brake.

Referring now to FIGS. 1 and 3, there is shown a schematic representation of the control apparatus, generally designated as 10, of the invention. This control apparatus is connected to a hand brake, generally designated as 11, for pneumatically controlling the application and/or release of the hand brake. This particular hand brake is discussed in detail in co-pending application Ser. No. 09/507,227, filed Feb. 18, 2000 entitled Automatic Application Hand Brake and is incorporated in this application by reference thereto.

The apparatus of the invention comprises a source of fluid pressure 14 engageable with the railway vehicle. A pneumatic actuation valve 16 is connected to the source of fluid pressure 14 for initiating communication of fluid pressure from this source. This pneumatic actuation valve 16 may be actuated by means of a push button 17.

A force regulating valve 18 is connected to the pneumatic actuation valve 16 for receiving fluid pressure from the pneumatic actuation valve 16. A mechanically driven valve 20 is also provided in series with and connected to the force regulating valve 18 for receiving fluid pressure from the force regulating valve 18 and for communicating this fluid pressure to the application cylinder 12 to activate the hand brake assembly.

A pilot operated valve 22 is positioned intermediate the mechanically driven valve 20 and the application cylinder 12 for communicating the fluid pressure fed from the mechanically driven valve 20 to the application cylinder 12. As shown in FIG. 3, this pilot operated valve 22 is optional and may be eliminated from the control apparatus 10 of the invention.

The force regulating valve 18 includes a first fluid pressure inlet means 24 and a second fluid pressure inlet means 26, as well as, a piston assembly 28 positioned intermediate this first and second fluid pressure inlet means. The piston assembly 28 is capable of moving within the force regulating valve 18 for opening and closing the force regulating valve 18 in response to a predetermined amount of fluid pressure supplied within either the first 24 and/or second 26 fluid pressure inlet means. The force regulating valve 18 essentially regulates the amount of fluid pressure subsequently supplied to said application cylinder in the manner as described below.

The first fluid inlet means 24 is in fluid communication with the pneumatic actuation valve 16 such that upon an application of a first predetermined amount of fluid pressure through the first fluid inlet means 24, the piston assembly 28 causes the force regulating valve 18 to open and communicate this first predetermined amount of fluid pressure to the mechanically driven valve 20. In other words, as a first predetermined amount of fluid pressure is fed from the pneumatic actuation means 16 into the first inlet means 24, the force of this fluid pressure is sufficient to move the piston 28 in a first direction 'so as to open the valve and allow the fluid pressure to be fed or communicated to the mechanically driven valve and subsequently to the application valve 12.

The second fluid inlet means 26 is in fluid communication with the mechanically driven valve 20 such that upon the application of a second predetermined amount of fluid pressure through the second fluid inlet means, the piston assembly 28 causes the force regulating valve 18 to close and terminate communication of fluid pressure to the mechanically driven valve 20 and consequently to the application cylinder 12. The mechanically driven valve 20 is in fluid communication with the second fluid inlet means 26 by means of fluid line 21 which branches off from fluid pressure line 19 before the fluid pressure within this line is fed to the application valve 12.

The piston assembly 28 includes a spring member 30 at a first end 31 for biasing the piston assembly in a normally closed position. The piston assembly 28 further includes a first 32 and second detent 34 at a second end 35. This first 32 and second detent 34 work in combination with a spring loaded spool 36 to hold the piston assembly 28 in either an open or closed position.

Figure 2:
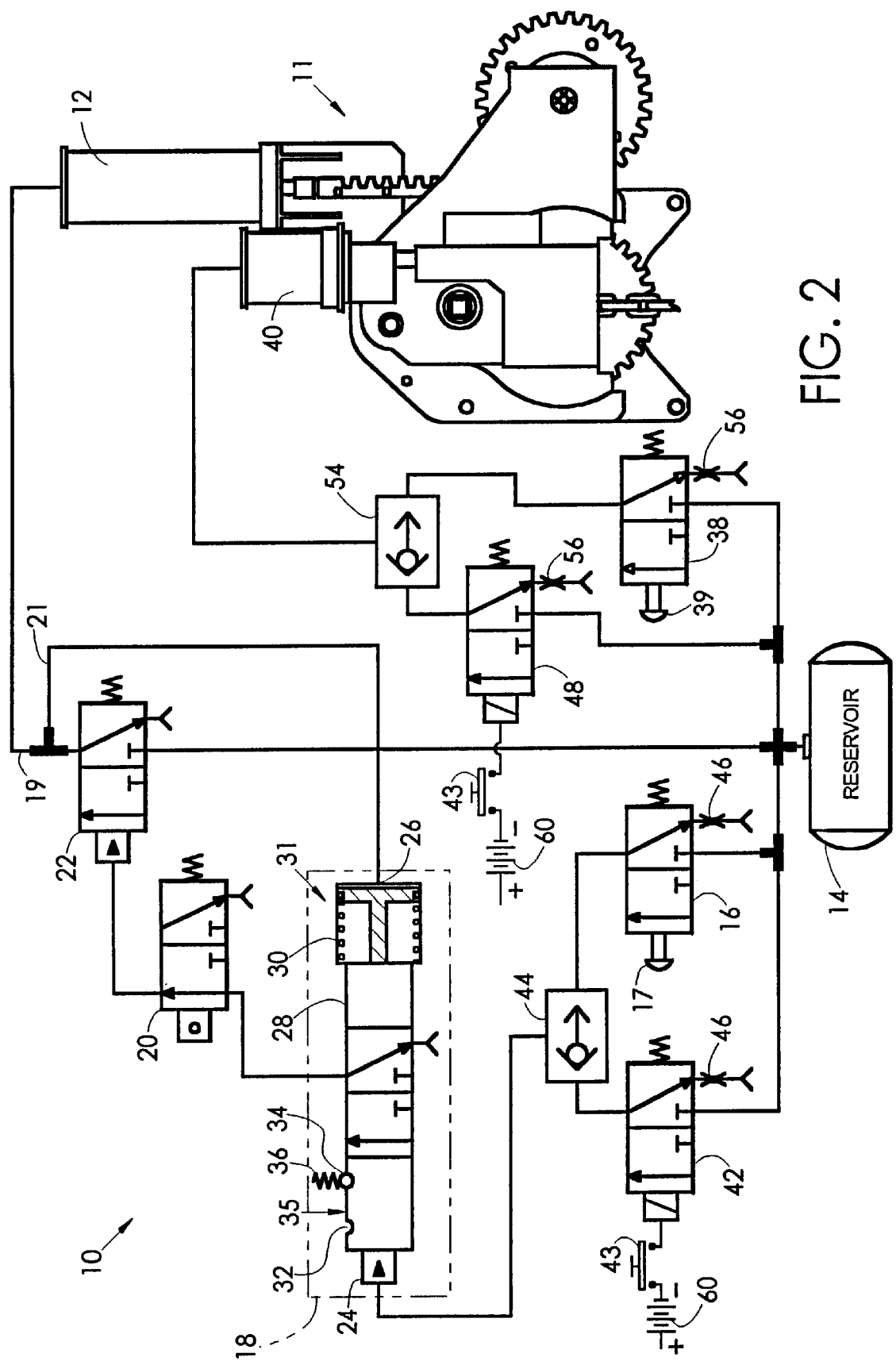
FIG. 2 is a schematic representation of the control apparatus of the invention connected to a hand brake for, pneumatically or electrically controlling the application and release of the hand brake.
Figure 4:
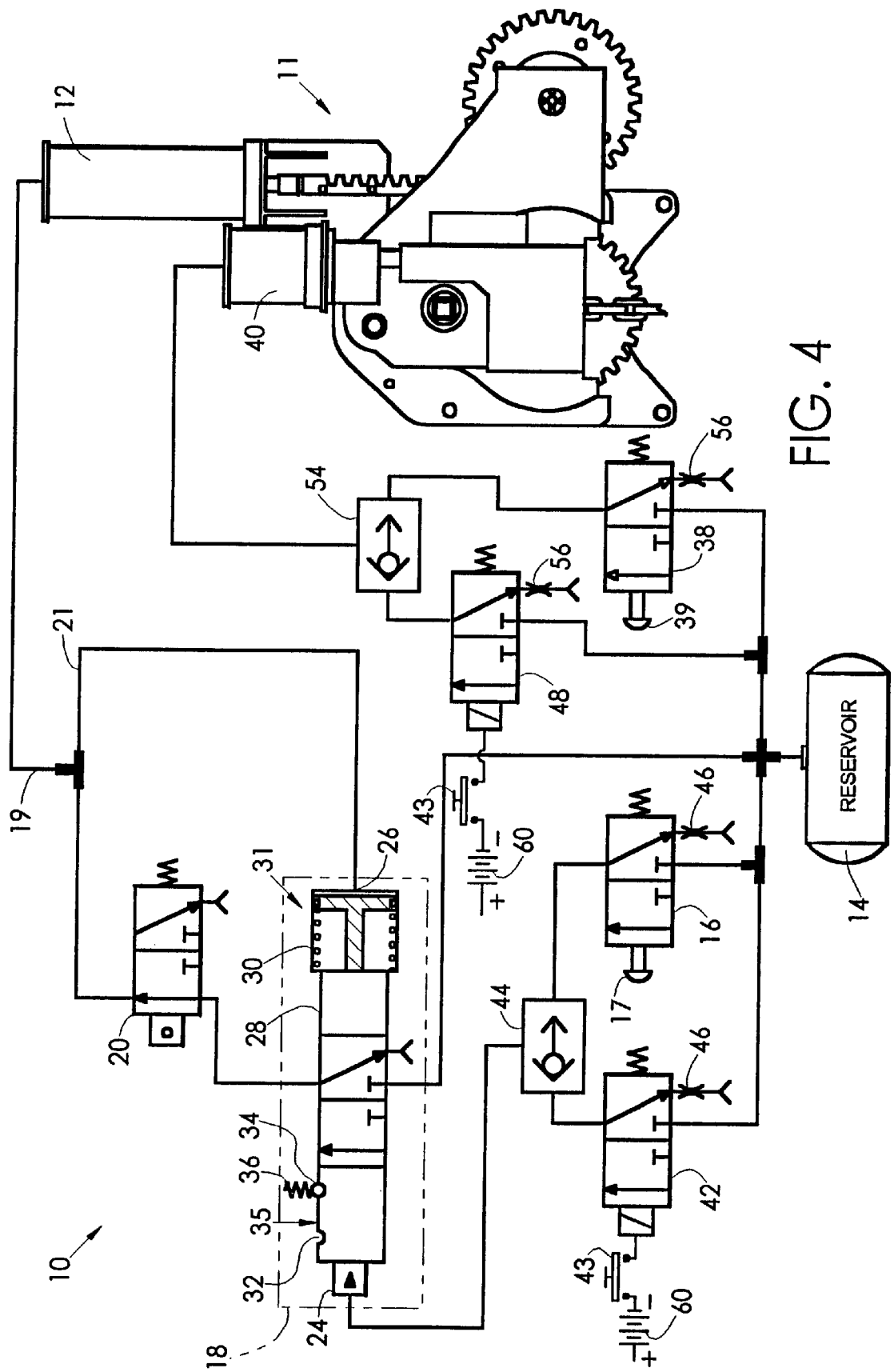
FIG. 4 is a schematic representation of a modified control apparatus connected to a hand brake for pneumatically and electrically controlling the application and release of the hand brake.

As shown in FIGS. 2 and 4, the control apparatus 10 may further include an electrically controlled actuation valve 42 positioned intermediate the source of fluid pressure 14 and the force regulating valve 18 to enable electrical actuation of fluid communication from the source of fluid pressure 14 to the force regulating valve 18. This electrically controlled actuation valve 42 may be controlled by any well power source, such as for example, a battery, as shown by element 60. A switch 43 such as a mechanical switch, transistor switch, or the like may be provided to activate the electrically controlled actuation valve 42. The term electrically controlled as used herein includes electronic control systems, hard wired systems or wireless systems such as radio control, infrared, microwave, or any other type of controlling means capable of activating switch 43. A two way check valve 44 may be positioned intermediate the pneumatic actuation valve 16 and the electrically controlled actuation valve 42. Another alternative would be to provide a choke means 46 on the pneumatic actuation valve 16 and the electrically controlled actuation valve 42 to bleed off excess fluid pressure to atmosphere. Note that FIGS. 2 and 4 illustrate both the two way check valve 44 and the choke means 46 in the control apparatus, however, the provision of only one of these devices would be necessary in the apparatus.

Also provided in the control apparatus illustrated in FIGS. 1–4 is a release actuation valve 38 which is connected to the source of fluid pressure 14 for initiating communication of fluid pressure from the source of fluid pressure 14 to a release cylinder 40 for releasing the brakes of the hand brake assembly 11. A push button 39 may be provided on the release pneumatic actuation valve 38 to enable manual actuation thereof. Also included in the apparatus is an electronically controlled actuation valve 48, activated by switch 43, positioned intermediate the source of fluid pressure 14 and the release cylinder 40 to enable electrical actuation of fluid communication from the source of fluid pressure 14 to the release cylinder.

A two way check valve 54. is positioned intermediate the release actuation valve 38 and the release electrically controlled actuation valve 48. Alternatively, as discussed above, the release pneumatic actuation valve 38 and the release electrically controlled actuation valve 48 may each include a choke means 56 for bleeding off excess fluid pressure to atmosphere.

The invention has been described in such full, clear, concise and exact terms so as to enable any person skilled in the art to which it pertains to make and use the same. It should be understood that variations, modifications, equivalents and substitutions for components of the specifically described embodiments of the invention may be made by those skilled in the art without departing from the spirit and scope of the invention as set forth in the appended claims. Persons who possess such skill will also recognize that the foregoing description is merely illustrative and not intended to limit any of the ensuing claims to any particular narrow interpretation.

We claim:

1. An apparatus engageable with a hand brake assembly on a railway vehicle for operation of an application cylinder for activating such hand brake assembly, said apparatus comprising:
    (a) a source of fluid pressure engageable with such vehicle;
    (b) a pneumatic actuation valve connected to said source of fluid pressure for initiating communication of fluid pressure from said source of fluid pressure;
    (c) a force regulating valve connected to said pneumatic actuation valve for receiving said fluid pressure from said pneumatic actuation valve; and
    (d) a mechanically driven valve placed in series with and connected to said force regulating valve for receiving said fluid pressure from said force regulating valve and for communicating said fluid pressure to said application cylinder to activate such hand brake assembly.

2. An apparatus as recited in claim 1 including a pilot operated valve positioned intermediate said mechanically driven valve and said application cylinder for communicating said fluid pressure from said mechanically driven valve to said application cylinder.

3. An apparatus as recited in claim 1 wherein said force regulating valve includes a first fluid pressure inlet means and a second fluid pressure inlet means and a piston assembly positioned intermediate said first and second fluid pressure inlet means, said piston assembly capable of moving within said force regulating valve for opening and closing said force regulating valve in response to a predetermined amount of fluid pressure supplied within one of said first and second fluid pressure inlet means and for regulating the amount of fluid pressure subsequently supplied to said application cylinder.

4. An apparatus as recited in claim 3 wherein said first fluid inlet means is in fluid communication with said pneumatic actuation valve such that upon an application of a first predetermined amount of fluid pressure through said first fluid inlet means, said piston assembly causes said force regulating valve to open and communicate said first predetermined amount of fluid pressure to said mechanically driven valve.

5. An apparatus as recited in claim 4 wherein said second fluid inlet means is in fluid communication with said mechanically driven valve such that upon the application of a second predetermined amount of fluid pressure through said second fluid inlet means, said piston assembly causes said force regulating valve to close and terminate communication of fluid pressure to said mechanically driven valve and consequently to said application cylinder.

6. An apparatus as recited in claim 3 wherein said piston assembly includes a spring member at a first end for biasing said piston assembly in a normally closed position.

7. An apparatus as recited in claim 6 wherein said piston assembly further includes a first and second detent at a second end, said first and second detent working in combination with a spring loaded spool for holding said piston assembly in one of an open and closed position.

8. An apparatus as recited in claim 1 further including an electrically controlled actuation valve positioned intermediate said source of fluid pressure and said force regulating valve to enable electrical actuation of fluid communication from said source of fluid pressure to said force regulating valve.

9. An apparatus as recited in claim 8 further including a two way check valve positioned intermediate said pneumatic actuation valve and said electrically controlled actuation valve.

10. An apparatus as recited in claim 8 wherein said pneumatic actuation valve and said electrically controlled actuation valve each include a choke means for bleeding off excess fluid pressure to atmosphere.

11. An apparatus as recited in claim 8 wherein said pneumatic actuation valve includes a push button for actuation thereof.

12. An apparatus as recited in claim 1 including a release actuation valve connected to said source of fluid pressure for initiating communication of fluid pressure from said source of fluid pressure to a release cylinder for releasing such hand brake assembly.

13. An apparatus as recited in claim 12 further including an electrically controlled actuation valve positioned intermediate said source of fluid pressure and said release cylinder to enable electrical actuation of fluid communication from said source of fluid pressure to said release cylinder.

14. An apparatus as recited in claim 13 further including a two way check valve positioned intermediate said release actuation valve and said electrically controlled actuation valve.

15. An apparatus as recited in claim 13 wherein said release actuation valve and said electrically controlled actuation valve each include a choke means for bleeding off excess fluid pressure to atmosphere.

16. An apparatus as recited in claim 1 wherein said pneumatic actuation valve includes a push button for actuation thereof.

17. An apparatus engageable with a hand brake assembly on a railway vehicle for one of pneumatic operation and electrical operation of an application cylinder for activating such hand brake assembly, said apparatus comprising:
    (a) a source of fluid pressure engageable with such vehicle;
    (b) an pneumatic actuation valve connected to said source of fluid pressure, said pneumatic actuation valve capable of initiating communication of fluid pressure from said source of fluid pressure upon activation thereof;
    (c) an electrically controlled actuation valve connected to said source of fluid pressure, said electrically controlled actuation valve capable of initiating communication of fluid pressure from said source of fluid pressure upon electrical activation thereof;
    (d) a force regulating valve in communication with said pneumatic actuation valve and said electrically controlled actuation valve for receiving said fluid pressure from one of said pneumatic actuation valve and said electrically controlled actuation valve; and (e) a mechanically driven valve connected to said force regulating valve for receiving said fluid pressure from said force regulating valve and for communicating said fluid pressure to said application cylinder to apply such hand brake assembly.

18. An apparatus as recited in claim 17 including a pilot operated valve positioned intermediate said mechanically driven valve and said application cylinder for communicating said fluid pressure from said mechanically driven valve to said application cylinder.

19. An apparatus as recited in claim 17 wherein said force regulating valve includes a first fluid pressure inlet means and a second fluid pressure inlet means and a piston assembly positioned intermediate said first and second fluid pressure inlet means, said piston assembly capable of moving within said force regulating valve for opening and closing said force regulating valve in response to a predetermined amount of fluid pressure supplied within one of said first and second fluid pressure inlet means and for regulating the amount of fluid pressure subsequently supplied to said application cylinder.

20. An apparatus as recited in claim 19 wherein said first fluid inlet means is in fluid communication with said pneumatic actuation valve such that upon an application of a first predetermined amount of fluid pressure through said first fluid inlet means, said piston assembly causes said force regulating valve to open and communicate said first predetermined amount of fluid pressure to said mechanically driven valve.

21. An apparatus as recited in claim 20 wherein said second fluid inlet means is in fluid communication with said mechanically driven valve such that upon the application of a second predetermined amount of fluid pressure through said second fluid inlet means, said piston assembly causes said force regulating valve to close and terminate communication of fluid pressure to said mechanically driven valve and consequently to said application cylinder.

22. An apparatus as recited in claim 21 wherein said piston assembly includes a spring member at a first end for biasing said piston assembly in a normally closed position and a first and second detent at a second end, said first and second detent working in combination with a spring loaded spool for holding said piston in one of an open and closed position.

23. An apparatus as recited in claim 17 further including a two way check valve positioned intermediate said pneumatic actuation valve and said electrically controlled actuation valve.

24. An apparatus as recited in claim 17 wherein said pneumatic actuation valve and said electrically controlled actuation valve each include a choke means for bleeding off excess fluid pressure to atmosphere.

25. An apparatus as recited in claim 17 including a release actuation valve connected to said source of fluid pressure for initiating communication of fluid pressure from said source of fluid pressure to a release cylinder for releasing such hand brake assembly and an release electrically controlled actuation valve positioned intermediate said source of fluid pressure and said release cylinder to enable electrically controlled actuation of fluid communication from said source of fluid pressure to said release cylinder.

26. An apparatus as recited in claim 25 further including a two way check valve positioned intermediate said release actuation valve and said release electrically controlled actuation valve.

27. An apparatus as recited in claim 25 wherein said release actuation valve and said release electrically controlled actuation valve each include a choke means for bleeding off excess fluid pressure to atmosphere.

\* \* \* \* \*